Sept. 10, 1963

J. F. SAIFUKU 3,103,186

PINEAPPLE PLANTER

Filed Dec. 6, 1960

James F. Saifuku
INVENTOR.

Sept. 10, 1963   J. F. SAIFUKU   3,103,186
PINEAPPLE PLANTER
Filed Dec. 6, 1960   3 Sheets-Sheet 3

James F. Saifuku
INVENTOR.

BY Clarence A. O'Brien
and Harvey B. Jackson
Attorneys

United States Patent Office 3,103,186
Patented Sept. 10, 1963

3,103,186
PINEAPPLE PLANTER
James F. Saifuku, Kailua, Oahu, Hawaii
(99–1015 Manako St., Aiea, Oahu, Hawaii)
Filed Dec. 6, 1960, Ser. No. 74,065
4 Claims. (Cl. 111—2)

The present invention relates to a machine for planting of plants within holes formed by the machine within the ground and is more particularly concerned with the planting of young pineapple plants and hence is related to by prior copending application No. 683,791, now Patent No. 3,005,425, and No. 56,224, respectively filed September 13, 1957, and September 15, 1960.

The instant invention differs from the inventions as previously disclosed in the aforesaid copending applications in that it is particularly concerned with planting machines wherein the planting hole is formed through paper laid flat on the ground and the young pineapple plant deposited therein in a more positive manner than was heretofore possible.

It is therefore a primary object of this invention to provide a pineapple planting machine which sequentially forms a planting hole and upon immediate completion thereof forcibly ejects the plant into the hole just prior to withdrawal of the hole forming tool.

Another object of this invention is to provide a pineapple planting machine involving a plurality of spaced plant containers movably mounted on the machine frame for movement rearwardly thereof past a planting station at such a speed that the plant container when positioned at the planting station on the machine frame will be virtually stationary with respect to the ground in view of the rearward movement of the plant container on the frame which is moving forwardly with respect to the ground whereby the lower ends of the plant container on which chiseled formations are formed may be engaged with the earth for spaced piercing thereof and upon pivotal separation or spreading of the lower chiseled ends form a planting hole and also providing a passage into the hole from a plant container through which the plant may be deposited into the hole prior to withdrawal of the chisel ends of the container from the hole.

An additional object of this invention is to provide in connection with the pineapple planting machine a fluid pressure nozzle ejector which is so positioned on the frame at the planting station as to direct a fluid jet into the plant container when in its open and plant depositing condition so as to positively eject therefrom the plant into the planting hole.

A further object of this invention is to provide a pineapple planting machine wherein the plant holder and hole forming tool is constituted by a pair of pivotally interconnected container sections which are spring biased to a closed position for retaining the plant therein and providing a chisel edge for piercing the earth surface. Cam means fixed to the machine frame is engageable with toggle links on the container sections so as to pivotally separate the sections at the planting station whereby the chisel formations at the lower ends of the container sections within the earth will separate to spread a hole and also form a passage for depositing of the plant from within the container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
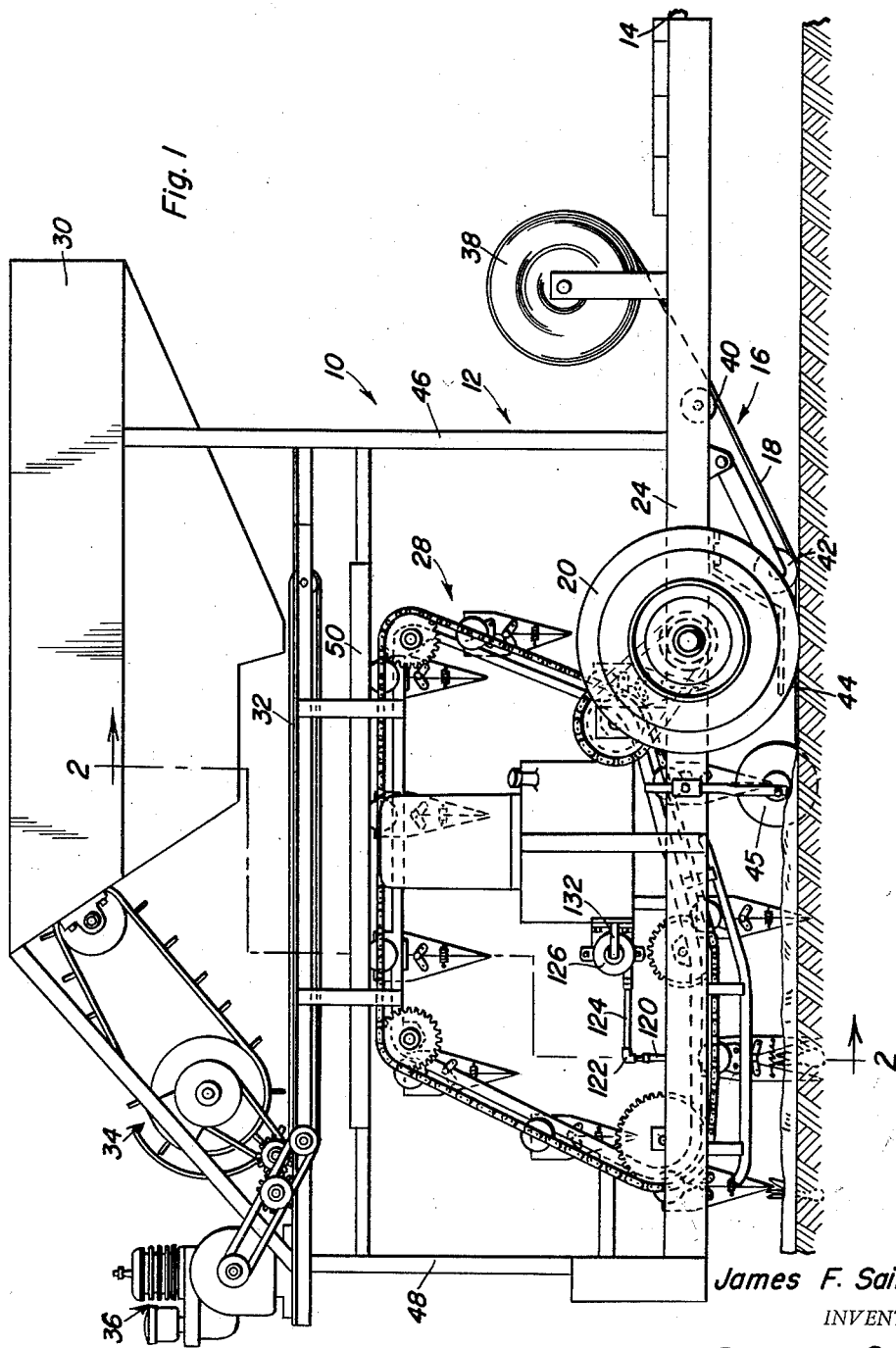
FIGURE 1 is a side elevational view of the pineapple planting machine made in accordance with this invention.

Referring now to the drawings in detail, attention is first invited toward FIGURE 1 which illustrates the machine of this invention generally referred to by reference numeral 10. It will be observed that the machine is supported on a wheeled frame assembly generally referred to by reference numeral 12 upon which all of the machine components are mounted. It will be noted that the forward end 14 of the frame assembly 12 is adapted to be hitched to some power equipment such as a tractor for drawing the machine frame forwardly through the planting fields. Mounted forwardly of the machine frame 12 is a paper laying mechanism generally referred to by reference numeral 16 whereby paper 18 is laid flat on the surface of the ground and may be wide enough for accommodating two rows of pineapple plants as more clearly seen from FIGURE 2. It should be understood of course, that the paper laying mechanism 16 may be dispensed with in which case the paper will be laid in some other manner prior to movement of the machine 10 thereover in order to accomplish the primary function thereof, the paper laying function being merely secondary or optional. The machine frame 12 in addition to being connected to the tractor vehicle for towing thereof will be supported above the ground by a pair of wheels 20 which are interconnected by means of the axle 22 as more clearly seen in FIGURE 2 which axle 22 is rotatably mounted between a pair of inwardly facing channel frame members 24 and 26 constituting part of the frame assembly 12. The planting mechanism of the machine 10 is generally referred to by reference numeral 28 and is mounted on the machine frame assembly 12 disposed mostly rearwardly of the wheels 20. Also provided on the machine frame assembly 12 is a hopper bin 30 which cooperates with an endless loading belt mechanism 32 and with a bin return mechanism 34, the belt mechanism 32 and the return mechanism 34 being driven by an internal combustion engine 36. The hopper bin 30, loading endless conveyor belt mechanism 32, return mechanism 34 and internal combustion engine 36 both as to their function, structure and locational relationship are more particularly described in my prior copending application No. 56,224. For purposes of this application, it will suffice to say that the young pineapple plants which are stored within the hopper bin 30 and deposited on the moving conveyor belt mechanism 32 may be selected therefrom by the operators on the machine for loading into the planting mechanism 28 with the remaining plants on the conveyor belt 32 being returned to the bin 30 by the return mechanism 34, the combustion engine 36 providing the motive power for both the belt mechanism 32 and the return mechanism 34.

With regard to the paper laying mechanism 16, it will be observed that the forward end of the frame assembly 12 mounts a roll of paper 38 which extends downwardly therefrom between the frame members 24 and 26 and guided by the roller 40 below the lever mounted pressure roller 42 for laying the paper 18 flat on the ground with the brush mechanism 44 being provided for smoothing out the paper flat on the earth surface. As heretofore mentioned, the paper laying mechanism 16 is optional and may be dispensed with if the paper is separately laid prior to the planting by the machine 10. When used however, a pair of paper covering disc plows 45 are provided in conjunction with the paper laying mechanism 16. The plows 45 are mounted on the frame members 24 and 26 and extend therebelow just rearwardly of the brush mechanism 44 to push earth onto the side portions of the paper to hold it down prior to the puncture thereof by the hole forming tools of the planting mechanisms.

Figure 2:
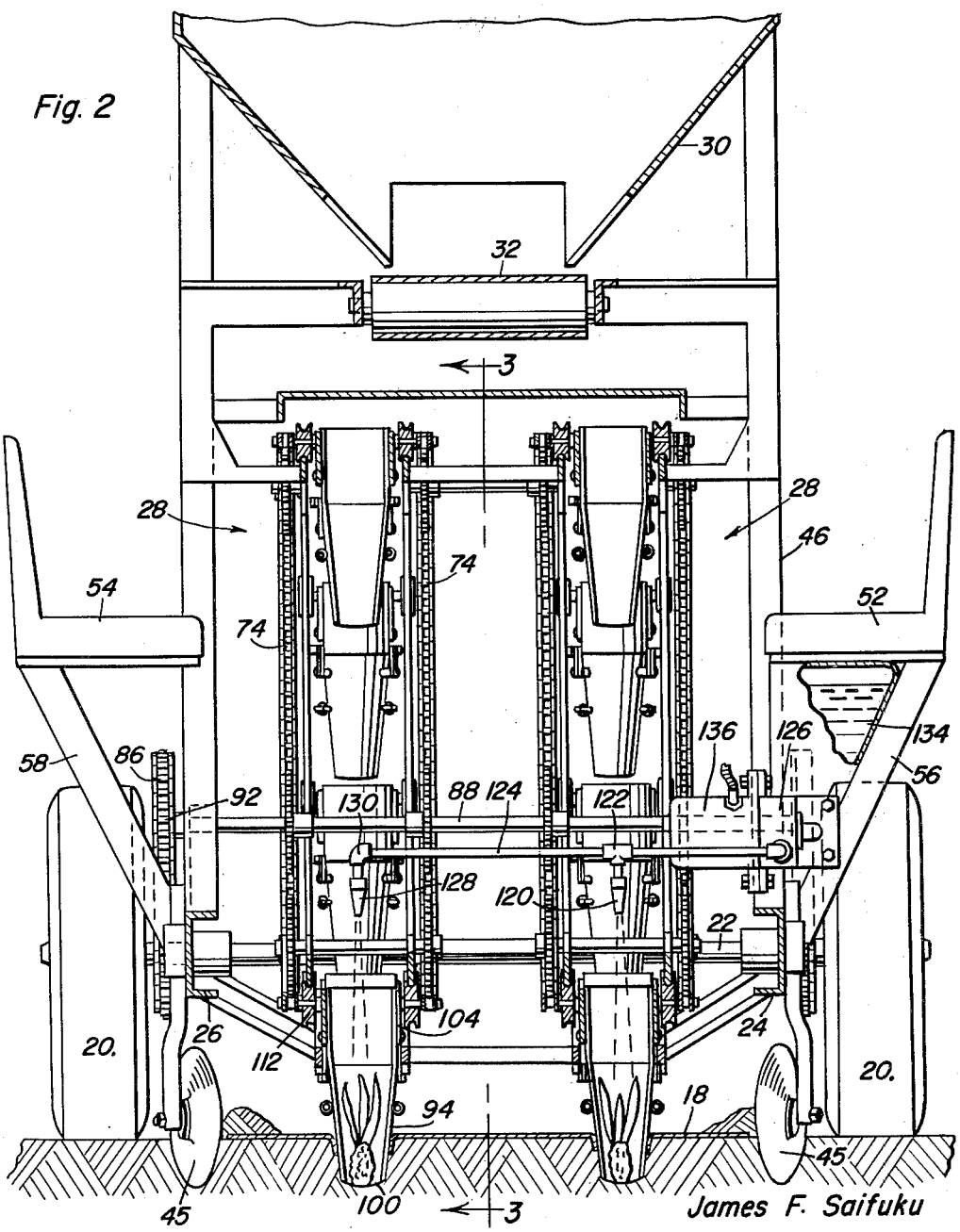
FIGURE 2 is a sectional view taken substantially through a plane indicated by section line 2—2 in FIGURE 1.

Referring now to FIGURES 1 and 2, it will be observed that a pair of planting mechanisms 28 are provided for by the machine 10 and mounted on the frame assembly 12 thereof so that a pair of pineapple plant rows may be planted simultaneously. The mechanisms 28 are disposed between the wheels 20 and disposed between pairs of vertical posts 46 and 48 respectively positioned forwardly and rearwardly of the frame assembly 12, said posts extending upwardly from the parallel horizontal channel frame members 24 and 26. The vertical post members 46 and 48 accordingly support therebetween the mounting structure for the internal combustion engine 36, the return mechanism 34, the loading belt mechanism 32 and the bins 30. Also mounted between the posts are the loading stations 50 for each of the planting mechanisms 28. It will also be noted that a pair of seats 52 and 54 are supported by the frame assembly 12 on opposite lateral sides of the machine 10, said seats being braced by brace members 56 and 58 whereby operators may be seated thereon in the proper position for loading pineapple plants taken from the conveyor belt 32 and the loading station 50 and placed within the planting mechanisms 28 as will hereafter become apparent.

Figure 3:
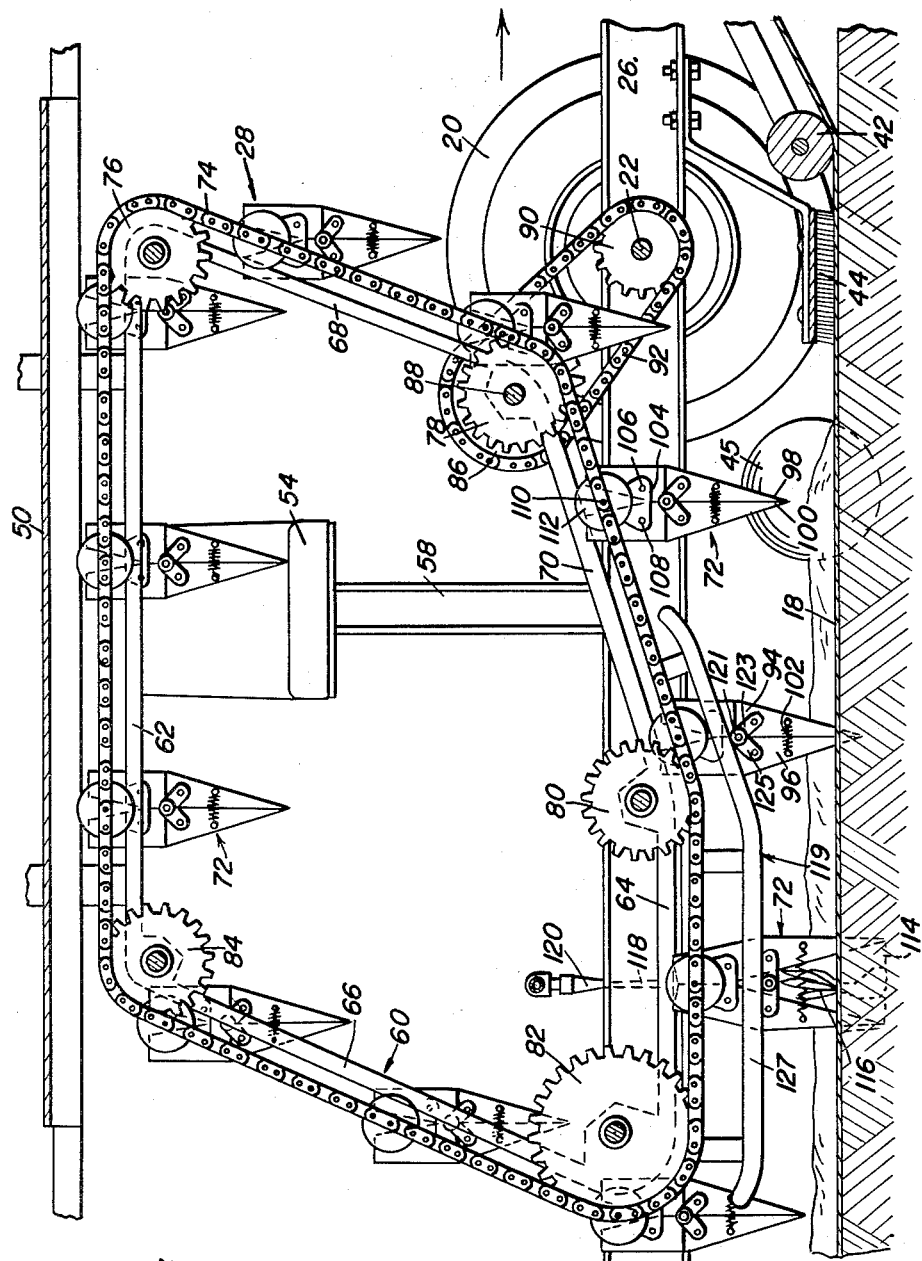
FIGURE 3 is a sectional view taken substantially through a plane indicated by section line 3—3 of FIGURE 2.

Referring now to FIGURES 2 and 3 in particular, it will be observed that each of the planting mechanisms 28 includes a rigidly mounted track formation generally referred to by reference numeral 60 which includes an upper horizontal leading portion 62, a lower shorter horizontal planting portion 64, rear side portion 66, forward side portion 68 and a lower transition connecting portion 70. Guidingly engaged by the track formation 60 are a plurality of spaced plant holding and hole forming mechanisms generally referred to by reference numeral 72 which are drivingly interconnected with each other by a pair of endless chain belts 74 disposed on each lateral side of the planting mechanism 28. The belts are entrained about a plurality of sprocket wheels 76, 78, 80, 82 and 84 rotatably mounted at each corner of the track frame formation 60. The sprocket wheel 78 constitutes the drive sprocket which is connected to driven sprocket wheels 86 mounted at each end of the drive shaft 88 to which the sprocket 78 is connected. A sprocket wheel 90 is therefore connected to the drive axle 22 on the inside of each of the wheels 20 whereby the wheels 20 may be drivingly interconnected to the endless drive 74 by means of the drive belt chains 92 which are entrained about the sprocket wheels 90 and 86 respectively connected to the wheel axle 22 and drive shaft 88. Accordingly, the drive belts 74 of each of the planting mechanisms 28 will be simultaneously driven at a predetermined relative speed to the forward movement of the machine frame 12.

From the foregoing, it will be appreciated that the plant holder and hole forming assemblies 72 will be driven in spaced relation to each other at a predetermined speed ratio to forward movement of the machine 10 so that when the assembly 72 is moved past the planting portion 64 of the track formation 60 it will be substantially stationary with respect to the ground by virtue of its rearward movement relative to the frame and forward movement of the frame over the ground. Accordingly, the planting action may be accomplished during the period in which the assembly 72 moves along the planting portion 64 of the track frame formation 60.

It will be observed that each of the plant holding and hole forming assemblies 72 include a pair of container sections 94 and 96. The bottom edges of the sections define chisel edges 98 and 100 whereby when the hole forming chisel portions 98 and 100 are together piercing of the paper and the earth therebelow may be accomplished. The lower portions of the container sections 94 and 96 are accordingly biased to a closed earth piercing condition by means of the spring elements 102 which is connected to the respective sections. The sections are pivotally mounted between a pair of plate members 104 by means of pivot pins 106 and 108. The plate members 104 also mount therebetween a connecting pin 110 by means of which the assembly 72 is connected to the endless drive belts 74. Also, rotatably mounted on the connecting pin 110 are a pair of guide rollers 112 which engage the outer edges of the track frame formation 60. Accordingly, the assemblies 72 are connected in spaced relation to each other on the drive belt 74 and guided by the track frame 60. The assembly sections 94 and 96 also will be spring biased by the spring elements 102 therein the lower ends thereof form a chisel to effectively pierce the surface of the earth a predetermined distance.

It will also be apparent that when the assemblies containing the plants therein and the chisel edges 98 and 100 at the lower ends thereof reach the planting portion 64 of the track frame by clockwise movement relative to the track frame as viewed in FIGURE 3, it will be necessary to separate the sections 94 and 96 against the bias of the spring elements 102 in order to form the planting holes 114 by spreading of the chisel edges 98 and 100 which would also form a passageway from the assembly 72 into the planting hole 114 through which the pineapple plant 116 may be deposited into the holes as indicated in FIGURE 3. Accordingly, a cam member 119 is fixedly mounted on the frame assembly 12 below the track frame 60 and engages the pivotal toggle connection 120 pivotally interconnecting a pair of toggle links 123 and 125 which are respectively pivotally connected to the assembly sections 94 and 96. Accordingly, when the assembly 72 is moved along the planting portion 64 of the track frame 60, the lower portion 127 of the cam member 119 will displace the toggle joint 121 downwardly in order to cause the sections 94 and 96 to be pivotally displaced with respect to their pivot pins 106 and 108. It will therefore be apparent that the planting assemblies 72 gradually approach and pierce the soil when moved along the transition portion 70 before reaching the planting portion 64 to enlarge the planting hole 114 by spreading of the chisel edges 98 and 100 and during such relative movement the pineapple plant 116 will be deposited within the holes 114. The assembly 72 then rapidly leaves the lower portion 64 of the frame 60 and is disengaged from the cam member 126 whereupon the spring 102 restores the assembly 72 to its closed earth piercing condition for return upwardly along the portion 66 to the horizontal loading portion 62 for movement forwardly of the frame. Loading of the assemblies 72 as they move past the portion 62 may be accomplished. It will be observed that in the closed earth piercing condition of the assemblies 72 the upper plant holding portions thereof will be outwardly displaced as compared with the upper portion of the assemblies when in the open hole spreading condition as illustrated for the assembly 72 located at the planting portion 64 of the frame 60. While the assemblies move along the tansition portion 70 of the track frame 60, the cam member 119 gradually begins to engage the toggle joint 121 and gradually begins to spread the lower chisel ends of the assembly 72 as the chisel edges aproach the bottom predetermined depth within the earth.

It will be observed further, that when the assemblies 72 are in the middle of the planting portion 64 of the frame in a fully open condition, the plants 116 are positively ejected therefrom by means of a fluid jet 118 issuing from a nozzle 120. Referring therefore to FIGURES 1 and 2, it will be observed that the nozzle 120 is connected by elbow 122 to a discharge conduit 124 from a pump mechanism 126. A similar nozzle 128 is provided for the other planting mechanism 28 also connected to the discharge conduit 124 by means of a right angle elbow 130 as seen in FIGURE 2. The pump mechanism has an inlet conduit 132 which is connected to a fluid reservoir 134 mounted beneath the seat 52. The reservoir 134 may contain either gas or liquid as desired. Any suitable power source 136 may be provided for driving the pump mechanism 126 as for example an electric motor powered by a generator driven from the internal combustion engine 36. Accordingly, it will be apparent that the jet nozzle 120 and 128 appropriately located with respect to the planting portion 64 of the track frame 60 will forcibly and positively eject the plant 116 from the assemblies 72 passing thereunder. Also, the planting holes 114 formed will be cleaned or bottomed as the plants 116 are deposited therein.

From the foregoing description, operation and utility of the planting machine of this invention will be apparent. Also it will be appreciated that a more efficiently operating machine is provided whereby both the planting holes and the plants are respectively formed and deposited in a more uniform and more rapid manner with a unique and novel planting mechanism.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a planting machine, a plant setting mechanism comprising, conveyor means having a portion movable rearwardly with respect to said machine at a speed substantially equal to forward movement of the machine, plant container means mounted in spaced relation on said conveyor means for movement of previously loaded plants along said rearwardly movable portion, hole forming means mounted on said container means adapted to pierce the earth therebelow to form and enlarge plant receiving holes, track means for guiding movement of said container means and said hole forming means along said rearwardly movable portion of the conveyor means to cause said hole forming means to gradually approach and penetrate the earth, remain stationary relative to said plant receiving holes for a predetermined interval and thereafter be rapidly withdrawn from the plant receiving holes, cam means operatively engageable with said hole forming means for effecting said enlargement of the plant receiving holes during the penetration of the earth, and ejection means operatively mounted for ejecting said plants from the container means into and dislodging loose earth within said plant receiving holes during said predetermined interval after the enlargement of the holes.

2. The combination of claim 1, wherein said hole forming means comprises chisel means formed at lower ends of the container means for engagement with the ground.

3. The combination of claim 1, wherein said ejection means comprises nozzle means vertically spaced above the container means along the rearwardly movable portion of the conveyor means and fluid pressure means operatively connected to the nozzle means for discharge of pressurized fluid through the container means into a formed hole for ejecting the plants from the container means as they pass under the nozzle means.

4. The combination of claim 1 wherein said container means includes a pair of container sections, roller means pivotally interconnecting said sections, said roller means guidingly engaging the track means, spring means connected to and biasing said sections toward each other, separable chisel tools mounted at lower ends of said sections and toggle link means pivotally connected to said container sections and engageable by the cam means for pivotally displacing the container sections against the bias of said spring means to enlarge the holes and release the plants.

References Cited in the file of this patent

UNITED STATES PATENTS

| | | |
|---|---|---|
| 1,178,408 | Paris | Apr. 4, 1916 |
| 1,638,048 | Matheson | Aug. 9, 1927 |
| 1,802,273 | Richards | Apr. 21, 1931 |
| 2,216,923 | Poll | Oct. 8, 1940 |
| 2,302,499 | Lacson | Nov. 17, 1942 |
| 2,503,828 | Loucks | Apr. 11, 1950 |
| 2,515,351 | Loucks | July 18, 1950 |
| 2,625,122 | Carelock | Jan. 13, 1953 |
| 2,749,855 | Guigas | June 12, 1956 |
| 2,804,033 | Burroughs | Aug. 27, 1957 |
| 2,831,442 | Montguire | Apr. 22, 1958 |

FOREIGN PATENTS

| | | |
|---|---|---|
| 502,005 | Italy | Nov. 26, 1954 |